(12) United States Patent
Gressett et al.

(10) Patent No.: US 9,095,482 B2
(45) Date of Patent: Aug. 4, 2015

(54) LIFT SYSTEM

(71) Applicants: Randall A. Gressett, Chandler, TX (US); Roy M. Akin, Chandler, TX (US)

(72) Inventors: Randall A. Gressett, Chandler, TX (US); Roy M. Akin, Chandler, TX (US)

(*) Notice: Subject to any disclaimer, the term of this patent is extended or adjusted under 35 U.S.C. 154(b) by 358 days.

(21) Appl. No.: 13/847,809

(22) Filed: Mar. 20, 2013

(65) Prior Publication Data
US 2014/0286740 A1    Sep. 25, 2014

(51) Int. Cl.
*A61G 3/06* (2006.01)
*B60P 1/44* (2006.01)

(52) U.S. Cl.
CPC ............ *A61G 3/062* (2013.01); *B60P 1/4414* (2013.01); *A61G 2220/00* (2013.01); *Y10S 414/134* (2013.01)

(58) Field of Classification Search
CPC ..... A61G 3/062; B60P 1/4414; B60P 1/4471; Y10S 414/134
USPC .................................... 414/546, 921
See application file for complete search history.

(56) References Cited

U.S. PATENT DOCUMENTS

| | | | | |
|---|---|---|---|---|
| 3,226,086 | A | * | 12/1965 | Lavieri et al. ............... 254/93 R |
| 5,674,043 | A | * | 10/1997 | Dorn ............................ 414/541 |
| 6,024,528 | A | * | 2/2000 | Taylor .......................... 414/495 |
| 2007/0212206 | A1 | * | 9/2007 | Milne et al. ................... 414/545 |

* cited by examiner

*Primary Examiner* — James Keenan

(57) ABSTRACT

Embodiments of the invention comprise a self-supporting platform style lift system operating from a transport position to a lifting position for assisting in egress and ingress from a vehicle. In a lifting position, a platform member extends from a rotating frame capable of axial rotation about a vehicle frame. A ground frame, lifting frame, and platform frame system allow the platform member to be raised and lowered to the vehicle. The point at which the platform frame and lifting frame make contact with the ground provides support for applied loads on the platform member, thereby reducing stress and strain on the frame of a vehicle. In a transport position, the platform member extends parallel with the face of the vehicle.

21 Claims, 12 Drawing Sheets ns. Specifically, embodi-
LIFT SYSTEM

BACKGROUND

The invention relates to lift systems. Specifically, embodiments of the invention relate to lift systems designed to provide persons with disabilities access to a vehicle.

Lift systems may be used by persons in wheelchairs, either manual or powered; persons who are unable to climb steps; or operators of mobility scooters. It is desirable to lift both the wheelchair and the occupant of the wheelchair to a vehicle, particularly a travel trailer type recreational vehicle (RV). Conventional handicapped lift systems must be fixedly mounted to the frame of a vehicle. Such systems depend on the structural strength of the vehicle. Such systems may also require permanent modification to a vehicle. Further, such systems may also interfere with functionality. Therefore, a need exists for a lift system which is capable of lifting a wheelchair and the occupant of the wheelchair to a vehicle, which provides a support means independent of the structural strength or suspension to the vehicle.

SUMMARY

Embodiments of the invention are directed to solving the need for a lift system which is capable of lifting a wheelchair and the occupant of the wheelchair to a vehicle, and provides a support means independent of the structural strength or suspension to the vehicle. Exemplary embodiments of the invention set forth herein pertain to RVs, however embodiments may also be directed towards other vehicles.

Embodiments of the invention comprise a self-supporting platform style lift system attached to a frame on one side an RV, near the door. The self-supporting platform style lift system operates from a transport position to a lifting position. When in transport, a platform extends parallel with the face of the RV. The platform is designed to maintain a reduced profile, for portability in transportation. In a lifting position, the platform extends from the RV, providing an elongate support surface. The platform is supported by one or more movable support members. The support members extend from the RV, and provide a means of structural support for the platform. The point at which the support members make contact with the ground provides support for applied loads on the platform, thereby reducing stress and strain on the frame of a vehicle.

BRIEF DESCRIPTION OF THE DRAWINGS

These and other features, aspects and advantages of embodiments of the invention will become better understood with regard to the following description, appended claims, and accompanying drawings where:

DESCRIPTION

Overview

Figure 1:
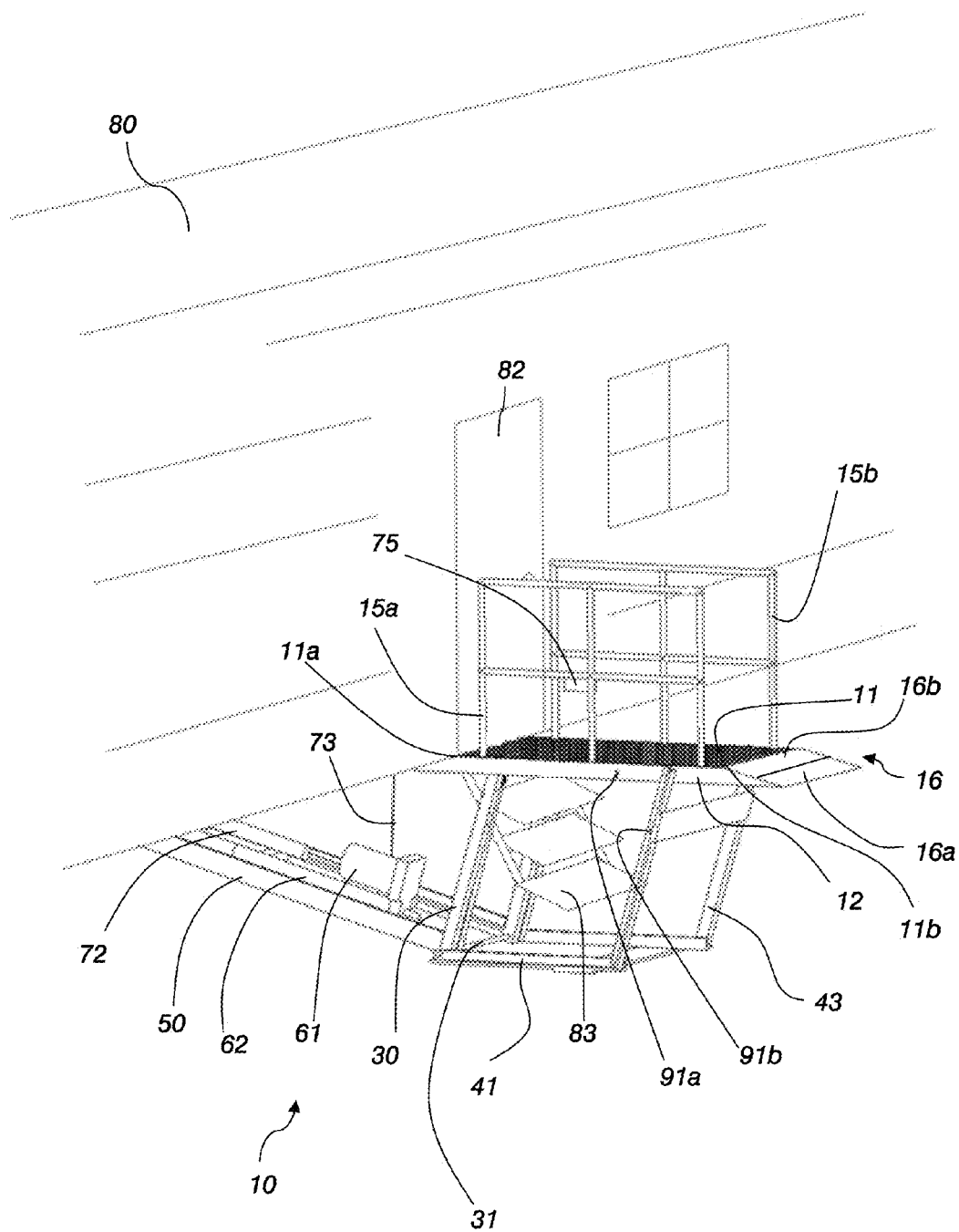
FIG. 1 illustrates a perspective view of a self-supporting platform style lift system attached to an RV, where the platform member is raised, according to an embodiment of the invention.

The following detailed description illustrates the preferred embodiment of the invention by way of example. This description will clearly enable one skilled in the art to make and use the invention, and will set forth the best mode of doing so. The embodiments listed herein are not intended to limit the scope of the invention. Several alternative embodiments are set forth, and it is contemplated that other permutations, arrangements, adaptations, uses, and variations of the invention are possible.

Detailed Description of the Elements

FIGS. 1-9 show a self-supporting platform style lift system of an embodiment of the invention. According to the embodiment, the self-supporting platform style lift system 10 is attached to an RV frame 81, on one side an RV 80, near the entrance 82 of the RV 80. The self-supporting platform style lift system 10 comprises: a platform member 11; a ground frame 21*a*, 21*b*; a lifting frame 30; a platform support frame system 41, 43; a rotating frame 50; a platform member lifting arrangement 61-64; and a ground frame lifting arrangement 71-74. The self-supporting platform style lift system 10 is movable between a transport position and a lifting position.

A platform member 11 is a longitudinally extending support surface forming the resting surface during lifting, having a front end 11*a* and a back end 11*b*. The platform member 11 is substantially planar, and constructed of a resilient material. The occupant of a wheelchair may position or load the wheelchair upon the platform member 11 for elevation to the entrance 82 of the RV 80. The platform member 11 has a platform frame 12, providing structural support for the platform member 11. The platform frame 12 has a frame aperture 91a, existing on both sides of the platform frame 12. A support stop element 16, allows a bridge from the ground to the platform member 11. The support stop element 16 is an extending planar surface comprised of a rear surface 16a and a front surface 16b. The rear surface 16a and front surface 16b meet near the center of support stop element 16, forming a dihedral angle. The support stop element 16 is pivotably fastened to the edge of the platform member 11. The support stop element 16 is allowed to axially rotate. A locking arm may lock the support stop element 16 into position, providing a wheel stop during lifting. A platform ramp may be used to allow a bridge from the platform member 11 to the entrance 82 of the RV 80. The platform ramp may be an extending planar surface, pivotably mounted to the edge of the platform member 11. Platform railing members 15a, 15b may be attached to the platform member upon deployment.

Figure 2:
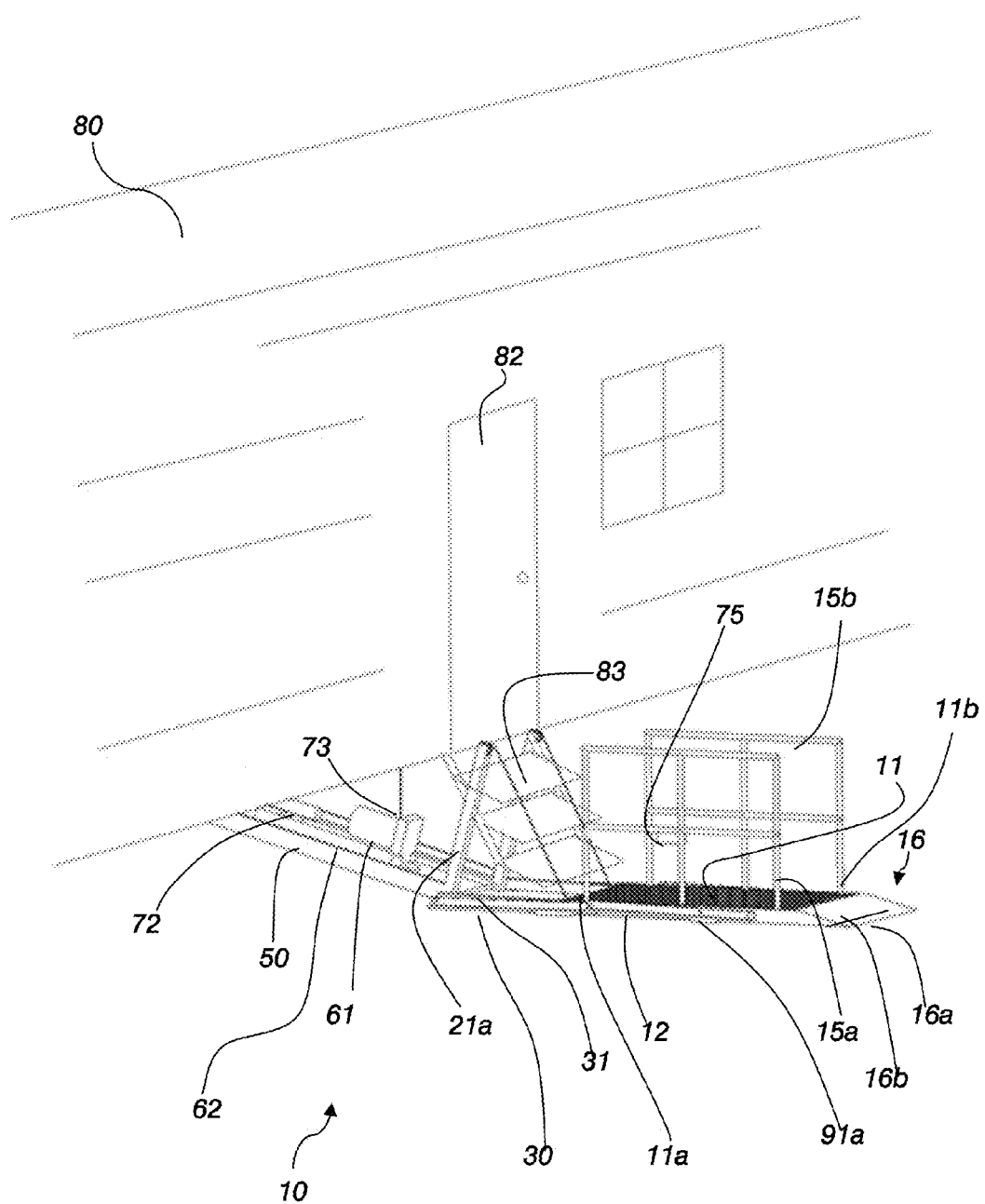
FIG. 2 illustrates a perspective view of a self-supporting platform style lift system attached to an RV, where the platform member is lowered, according to the embodiment of FIG. 1.

A ground frame is comprised of individual support members 21a, 21b. The individual support members 21a, 21b, are longitudinally extending support beams, constructed of resilient material. Each individual support member 21a, 21b extends perpendicular with said rotating frame 50, as illustrated in FIG. 2, 3. The individual support members 21a, 21b are spaced a width apart, such as to permit occupant to enter an RV 80. In the exemplary embodiment, the width is greater than the horizontal surface of the stairs 83 of the RV 80. Each individual support member 21a, 21b may be attached to the RV frame 81 via ground frame attachment brackets or other equivalent means.

Figure 3:
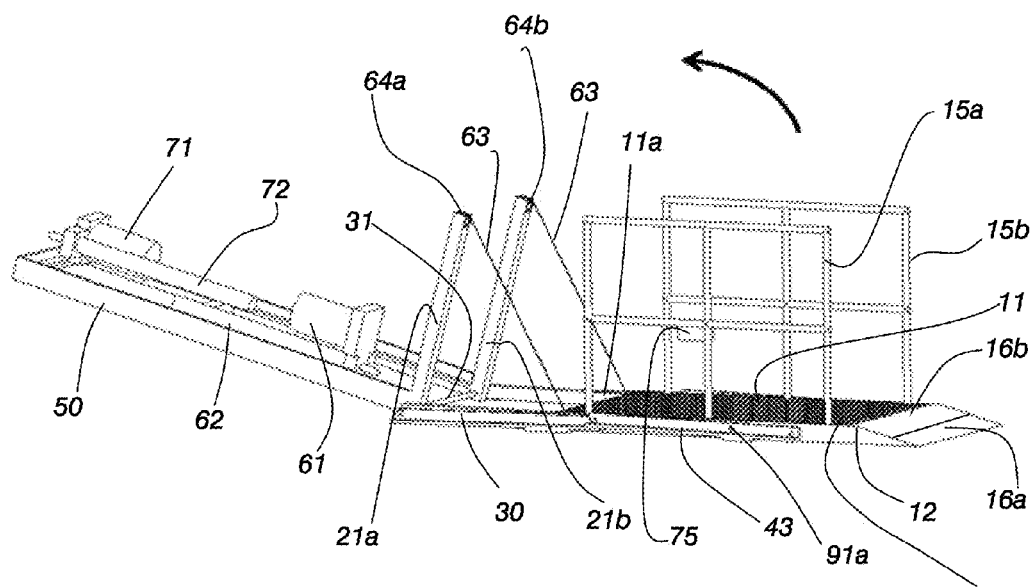
FIG. 3 illustrates a perspective view of a self-supporting platform style lift system, showing the relative motion of the platform member during lifting, according to the embodiment of FIG. 1.
Figure 4:
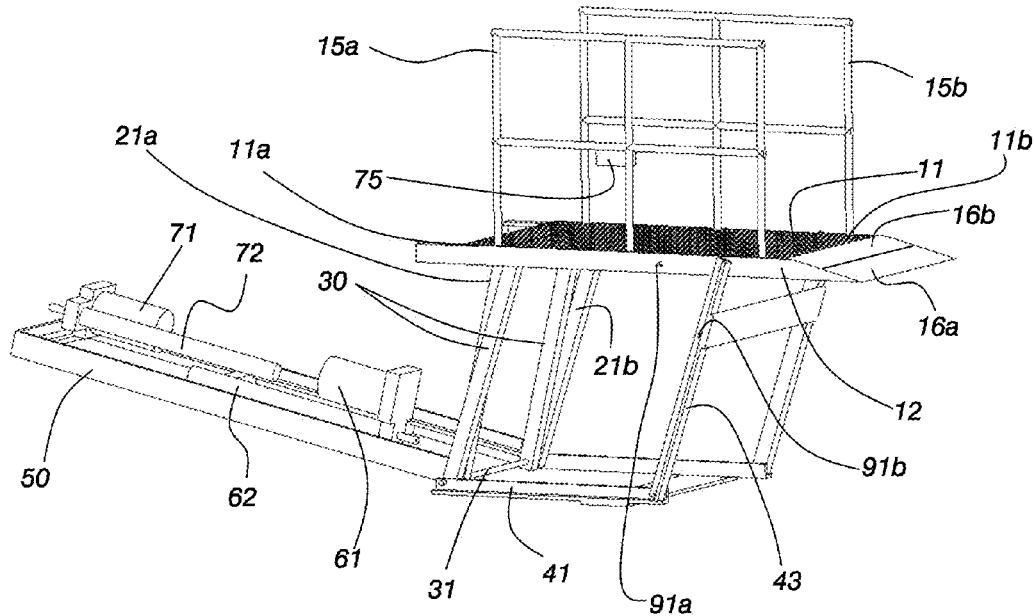
FIG. 4 illustrates a perspective view of a self-supporting platform style lift system, where the platform member is raised, according to the embodiment of FIG. 1.
Figure 5:
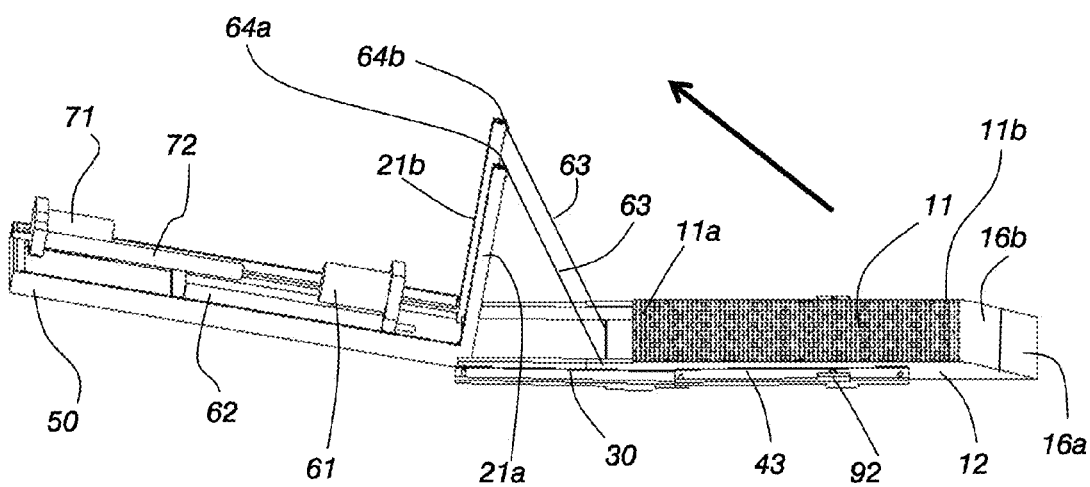
FIG. 5 illustrates a perspective view of a self-supporting platform style lift system, showing the relative motion of the platform member to the transport position, according to the embodiment of FIG. 1.
Figure 6:
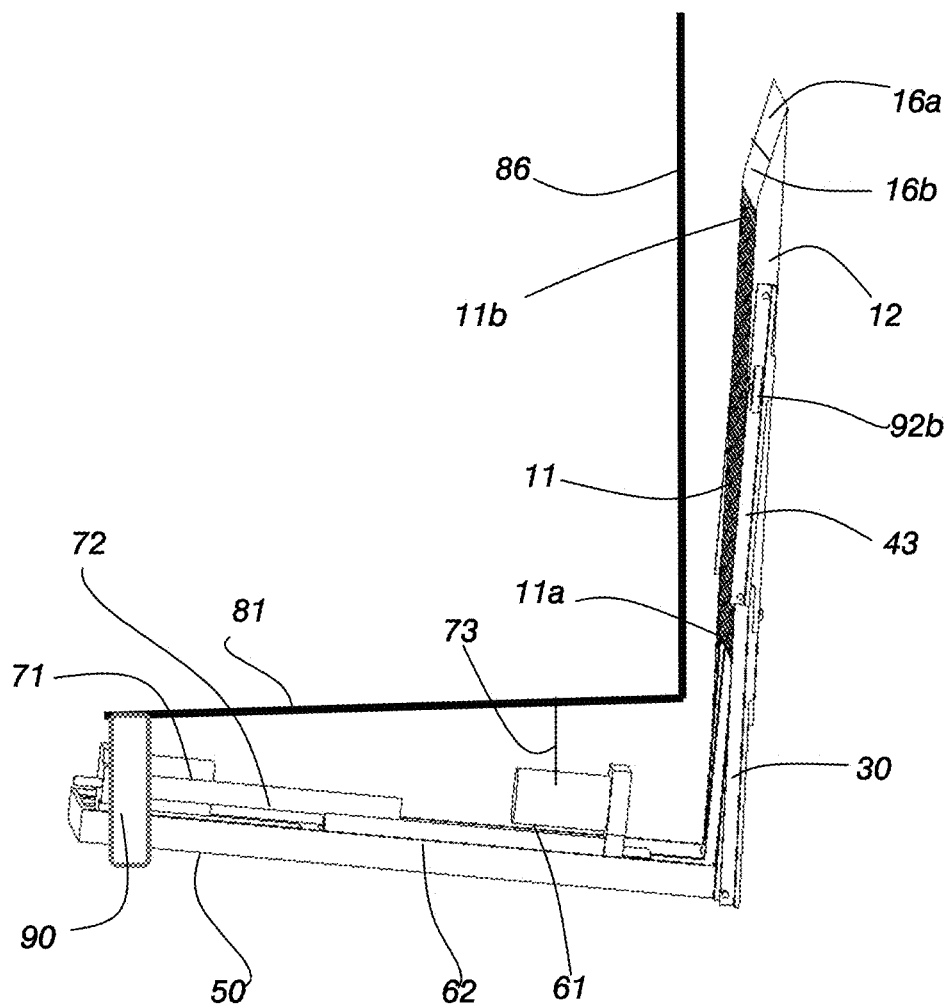
FIG. 6 illustrates a side view of a self-supporting platform style lift system attached to an RV, showing the relative positioning of the platform member in the transport position, according to the embodiment of FIG. 1.
Figure 7:
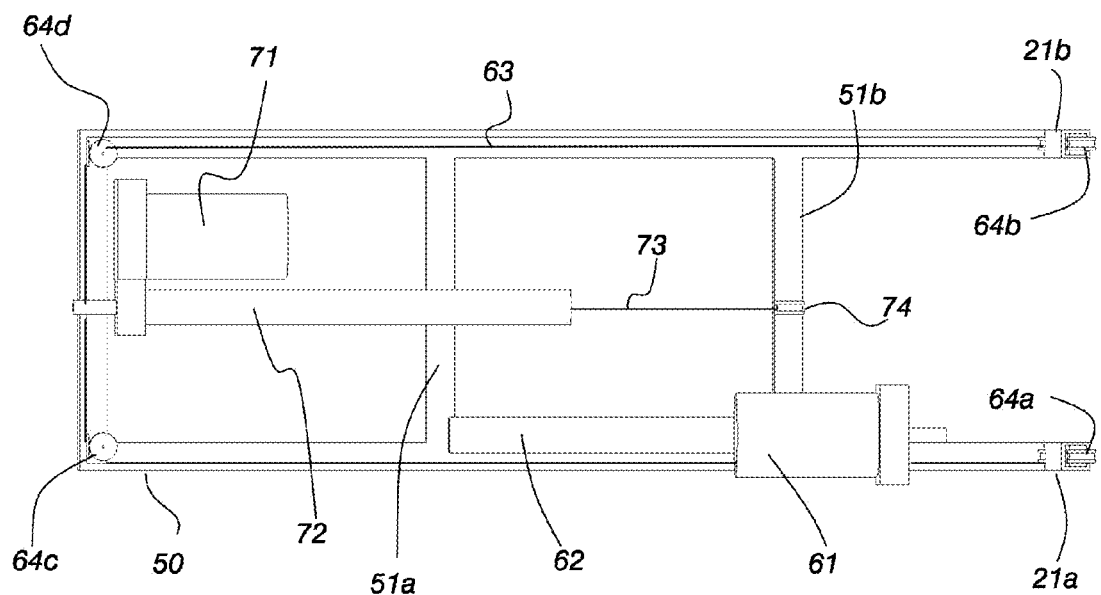
FIG. 7 illustrates a top view of a rotating frame, according to the embodiment of FIG. 1.
Figure 8:
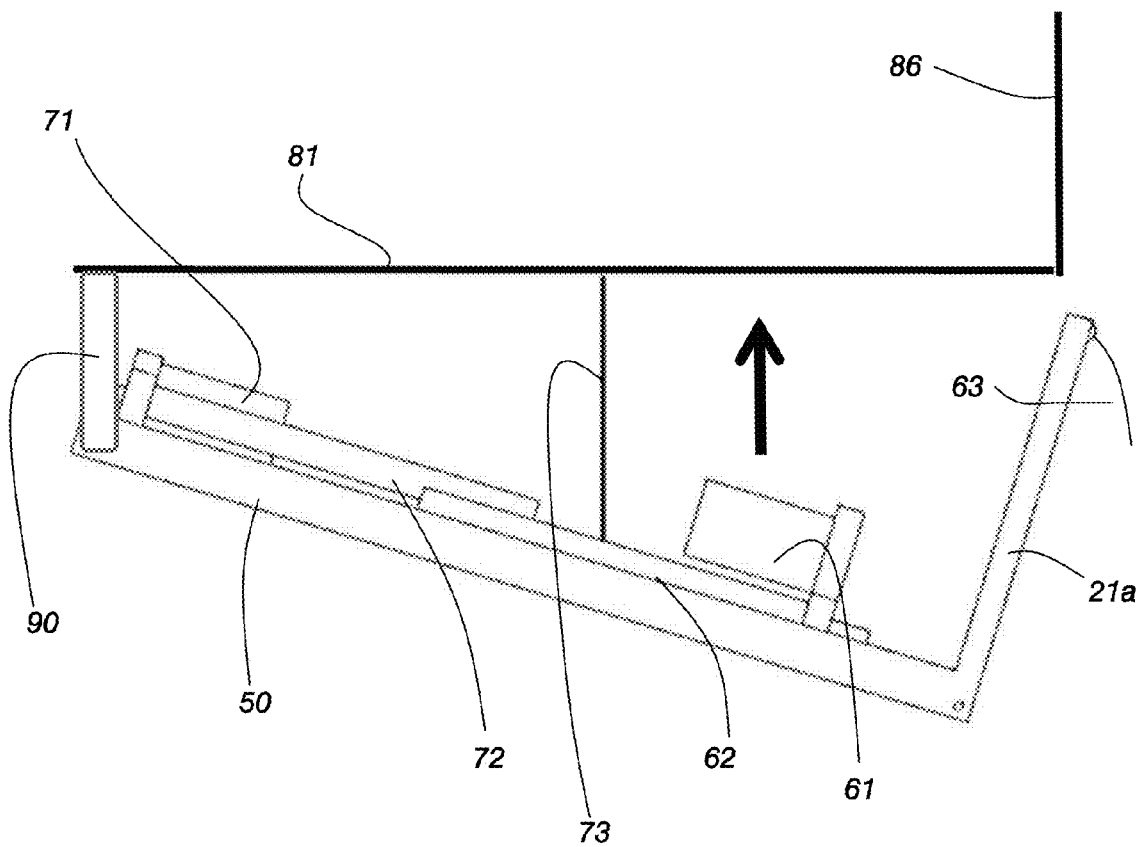
FIG. 8 illustrates a side view of a self-supporting platform style lift system attached to an RV, showing the relative motion of the rotating frame when raising the rotating frame, according to the embodiment of FIG. 1.
Figure 9:
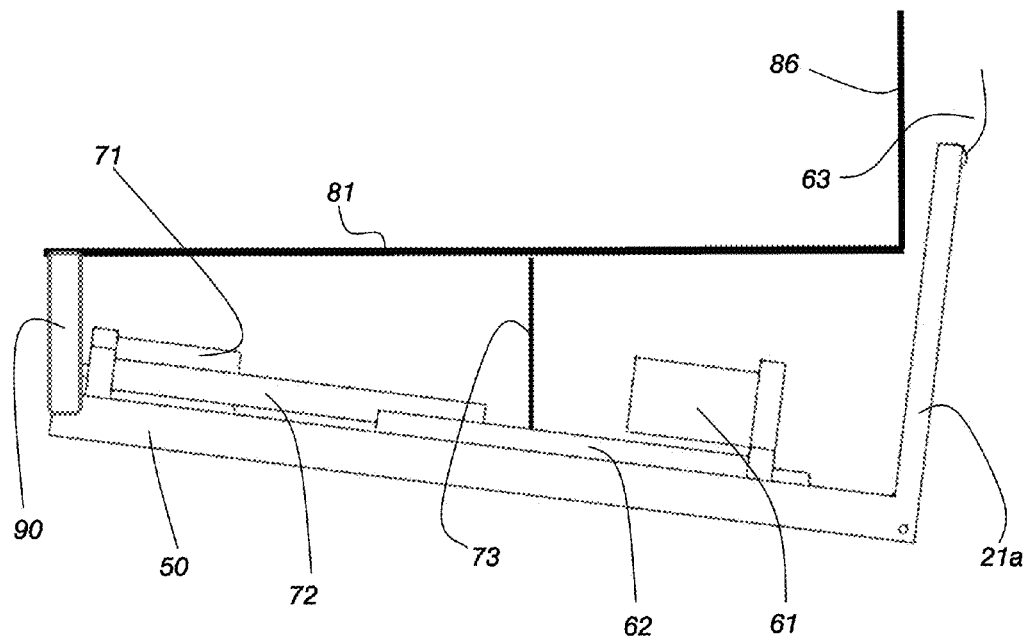
FIG. 9 illustrates a side view of a self-supporting platform style lift system attached to an RV, according to the embodiment of FIG. 1.
Figure 10:
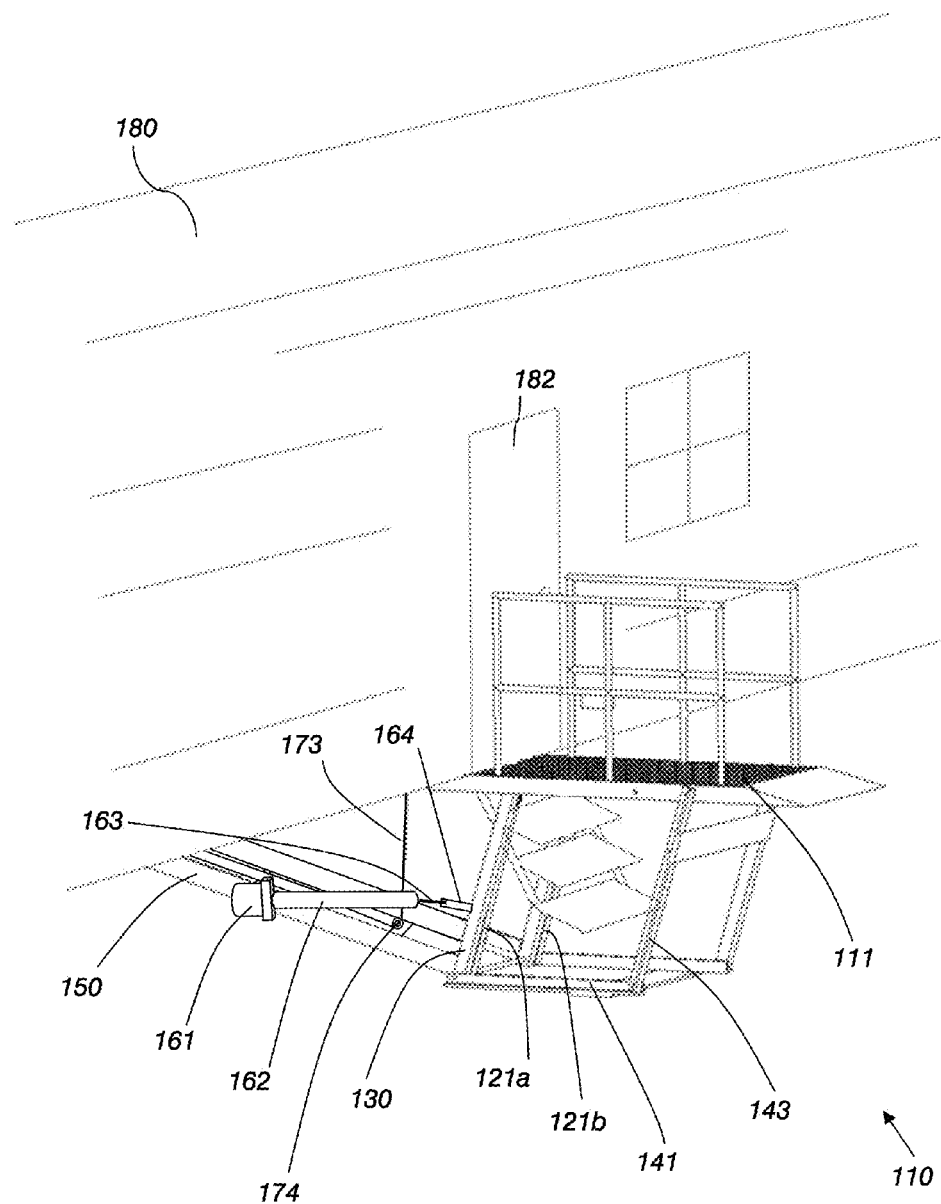
FIG. 10 illustrates a perspective view of a self-supporting platform style lift system attached to an RV, where the platform member is raised, according to an alternate embodiment of the invention.
Figure 11:
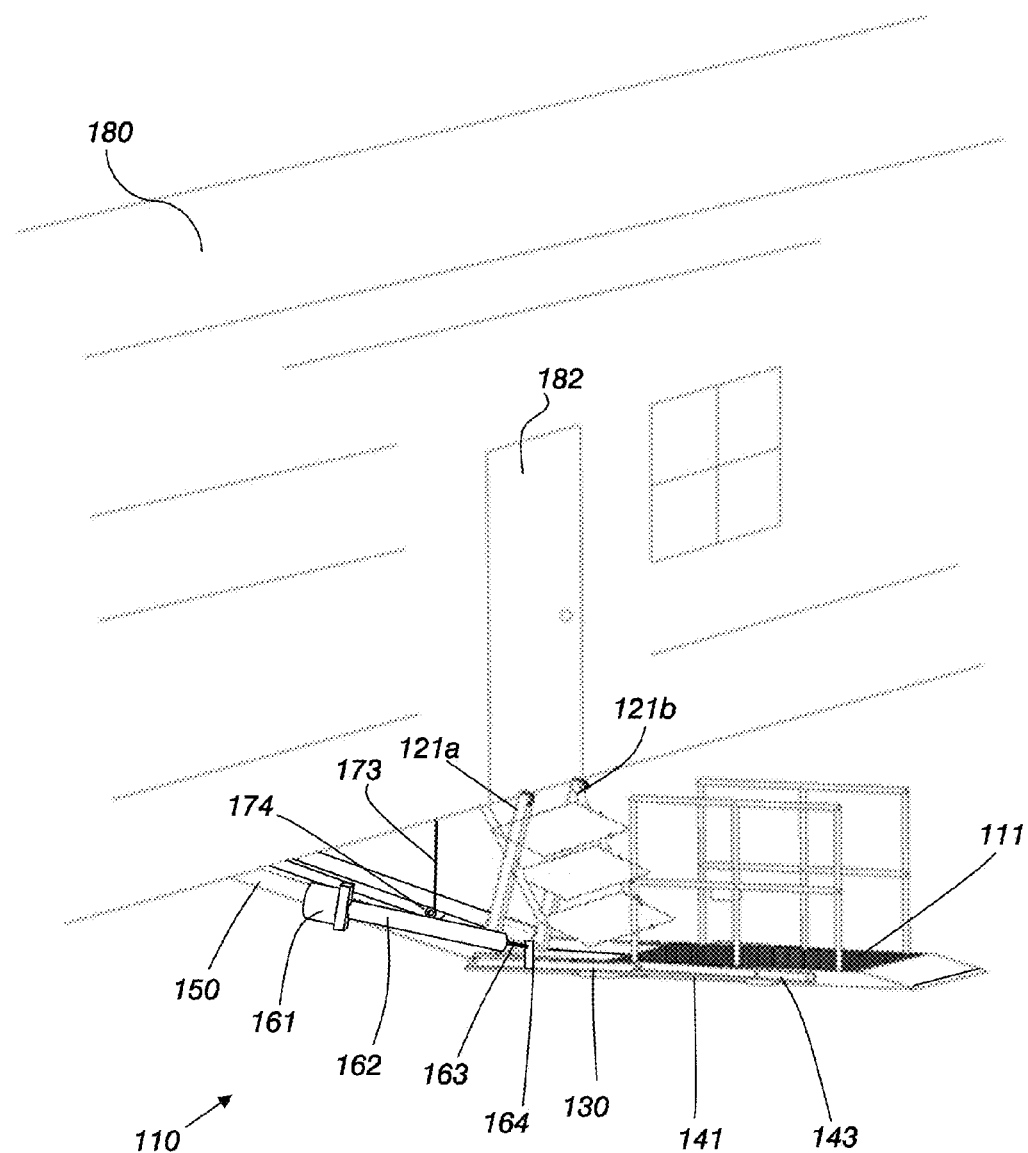
FIG. 11 illustrates a perspective view of a self-supporting platform style lift system attached to an RV, where the platform member is lowered, according to the embodiment of FIG. 10.
Figure 12:
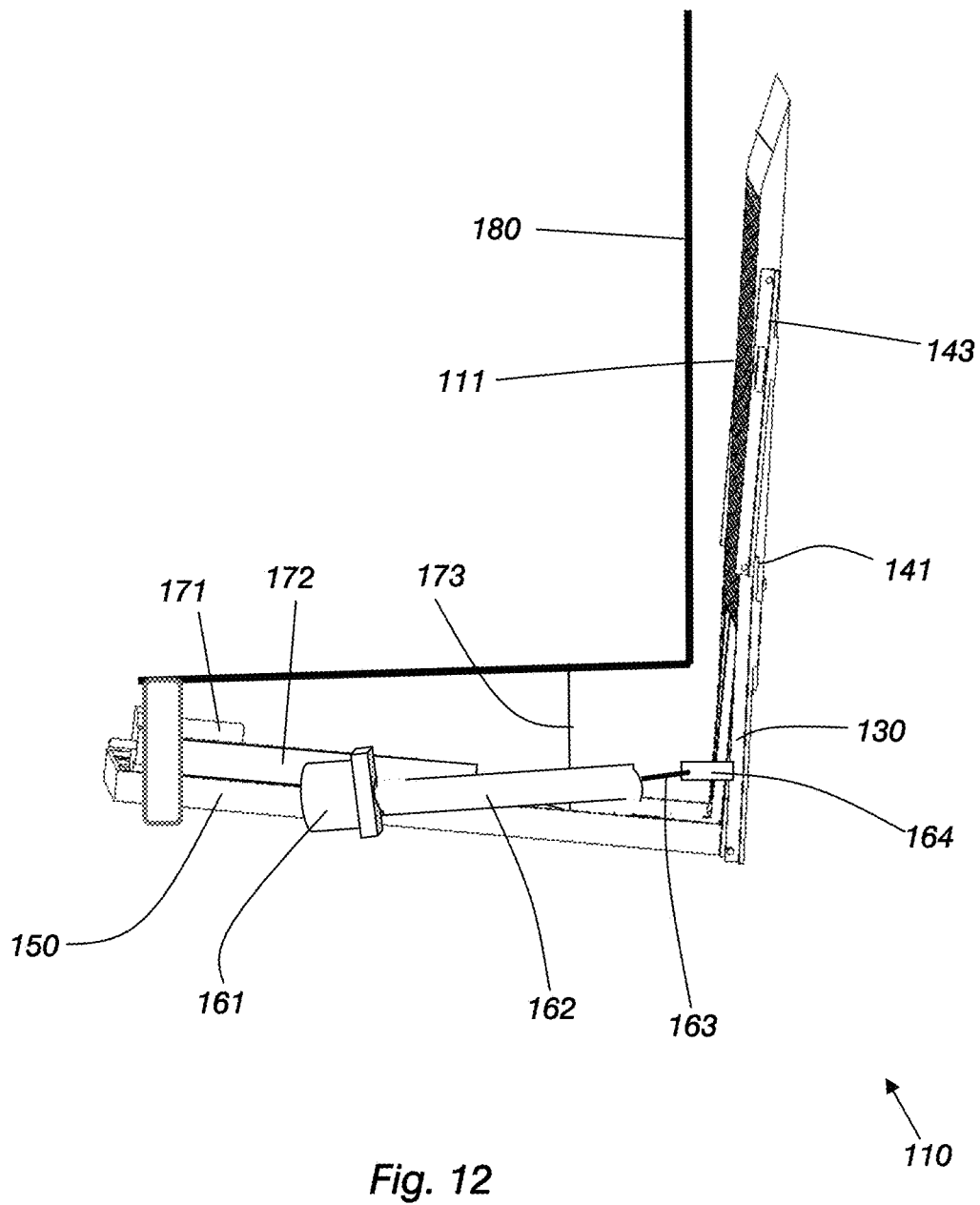
FIG. 12 illustrates a side view of a self-supporting platform style lift system attached to an RV, showing the relative positioning of the platform member in the transport position, according to the embodiment of FIG. 10.
Figure 13:
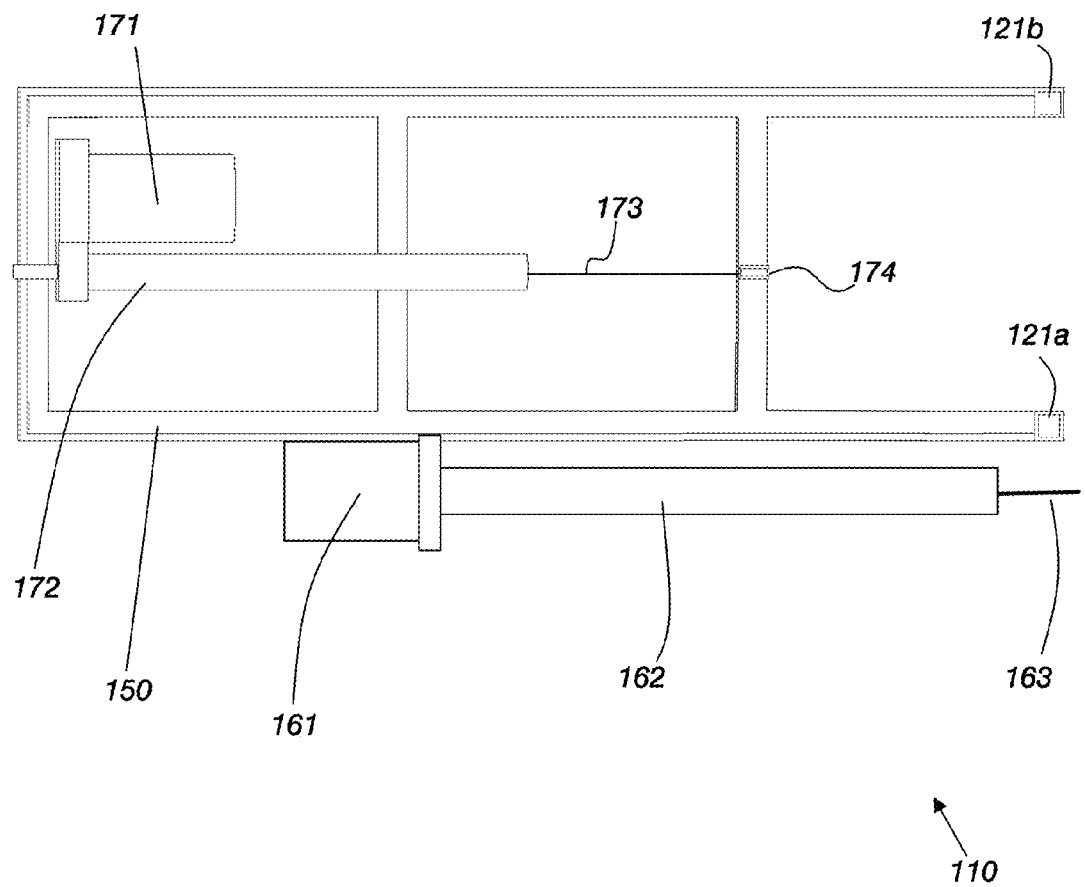
FIG. 13 illustrates a top view of a rotating frame, according to the embodiment of FIG. 10.

A lifting frame 30 is lift support element, rotatably fastened at one end to said rotating frame 50, and at another end to said platform member 11. The lifting frame 30 is capable of axial rotation relative to a lift pivot 31. In the exemplary embodiment, the lifting frame 30 is a substantially planar elongate support member, affixed to the lift pivot 31. The lift pivot 31 is rigid elongate cylinder. The lift pivot 31 attaches to the side of the lifting frame 30 closest to the RV 80, and extends a lower portion of each individual support member 21a, 21b. During lifting, the lifting frame 30 rotates axially upward about the lift pivot 31, applying an upward moment force on the lower surface of the platform member 11. The relative motion of the platform member 11 is illustrated in FIG. 3. During deployment, the lifting frame 30 rotates axially downward about the pivot 31, allowing the platform 11 to descend. The platform 11 is connected to the lifting frame 30 by a pair of connection bolts (although other means of connection are contemplated). Such connection allows the platform 11 to axially rotate with respect to the lifting frame 30 during lifting.

FIG. 3 shows a platform support frame system 41, 43. The platform support frame system comprises a lower support member 41, and a pivot member 43. A lower support member 41 is a substantially planar, rigid, support body, which rotatably fastens at one to the lifting frame 30, and rotatably fastens at another end to the pivot member 43. A pivot member 43 comprises a pair of longitudinally extending beams, which rotatably fasten at one to the lower support member 41, and rotatably fastens at another end to the platform frame 12. Each longitudinally extending beam attaches on one side by a pair of beam connection bolts (or other fixable means). The pivot member 43 has a pivot aperture 91b, attached to both sides of the pivot member 43. Both the lower support member 41, and pivot member 43 is capable of free axial rotation with respect to the platform member 11, and lift pivot 31.

A rotating frame 50 is a resilient longitudinally extending support frame capable of being mounted to the RV frame 81. The rotating frame 50 is capable of axial rotation at one end of the rotating frame 50 with respect to the RV frame 81. A pair of beam support members 51a, 51b, may extend across the rotating frame 50 for additional support. One end of the rotating frame 50 (the end opposing the entrance 82) is attached to the RV frame 81 via frame mounting brackets 90. The other end of the rotating frame 50 is attached to the individual support members 21a, 21b.

A platform member lifting arrangement 61-64 allows the platform member 11 to be raised or lowered between the ground and the entrance 82 of the RV 80. The platform member lifting arrangement 61-64 uses a lifting motor 61, lifting actuator 62, lifting cable 63, a pair of lifting pulleys 64a, 64b, and a pair of rotating frame pulleys 64c, 64d. A lifting motor 61 is a 12 volt electrical motor, fixedly attached to the rotating frame 50, and connected to the RV's 12 volt electrical system. The lifting motor 61 drives the lifting actuator 62, which is fixedly attached to the rotating frame 50. The lifting actuator 62 is connected to a lifting cable 63. The lifting cable 63 is an elongate tensile material, applying a lifting force to the platform member 11. The pair of lifting pulleys 64a, 64b are located on the upper surface of individual support members 21a, 21b. The pair of rotating frame pulleys 64c, 64d are located on the rotating frame 50. A length of lifting cable 63 extends in one direction: from the lifting actuator 62, around the rotating frame pulleys 64c, 64d; into the internal portion of an individual support member 21b; over a lifting pulley 64a; underneath the lifting frame 30, and attaches to the platform frame 12. A length of the lifting cable 63 extends in the opposite direction: from the lifting actuator 62 into the internal portion of an individual support member 21a; over a lifting pulley 64a; underneath the lifting frame 30, and attaches to the platform frame 12. A pair of tension springs (not shown) extend from the lifting frame 30, to the platform member 11.

A ground frame lifting arrangement 71-74 allows raising and lowering of the rotating frame 50, with respect to the RV frame 81. The ground frame lifting arrangement 71-74 comprises a deployment motor 71, a deployment actuator 72, a deployment cable 73, and a deployment pulley 74. A deployment motor 71 is a 12 volt electrical motor, fixedly attached to the rotating frame 50, and connected to the RV's 12 volt electrical system. The deployment motor 71 drives the deployment actuator 72, which is fixedly attached to the rotating frame 50. The deployment actuator 72 is connected to a deployment cable 73. The deployment cable 73 is an elongate tensile material, fixedly attached to the lower surface of the RV frame 81. A length of deployment cable 73 extends over the deployment pulley 74. The deployment pulley 74 is mounted on the beam support member 51b.

One or more electrical switches 75 may be placed on the surfaces of the RV 80 or self-supporting platform style lift system 10. According to the current embodiment, an electrical switch 75 is placed on a platform railing member 15a; and on the inside of the RV 80 (not shown). The electrical switch 75 allows for the operator to actively deploy or activate the self-supporting platform style lift system 10.

The self-supporting platform style lift system 10 is movable between a transport position to a lifting position. In the transport position, the rotating frame 50 is raised such it is substantially parallel with the RV frame 81. The platform member 11, ground frame 21a, 21b, lifting frame 30, platform support frame system 41, 43, rotating frame 50, platform member lifting arrangement 61-64 and ground frame lifting arrangement 71-74 are raised such that they are substantially parallel with the side surface of the RV 86, and perpendicular with the ground. When in transport position, the self-supporting platform style lift system 10 extends approximately 3 inches beyond the side of the RV 86 (less space than required for the factory installed awning) and is supported with frame brackets 90, and not the lifting cable 63. The self-supporting platform style lift system 10 engages the side of the RV 86 such that it does not interfere with the operating or storage of the awning. One or more support pins 92 may be inserted into the platform aperture 91*a*, and pivot aperture 91*b*, securable fastening the platform member 11 during transport.

How the Invention is Used

Deployment of the self-supporting platform style lift system 10 involves first lowering the rotating frame 50; and next raising/lowering the platform member 11. Engaging the deployment motor 71 allows the rotating frame 50 to downwardly axially rotate about the frame mounting brackets 90—which lowers the rotating frame 50. The rotating frame 50 is lowered such that the lower surface of the individual support members 21*a*, 21*b* make contact with the ground. A small piece of material such as wood may be placed between the individual support members 21*a*, 21*b* to reach desired height.

The platform member 11, ground frame 21*a*, 21*b*, lifting frame 30, platform support frame system 41, 43 are lowered into lifting position such that they are substantially perpendicular with the side surface of the RV 86, and parallel with the ground. Engaging the lifting motor 61 allows the lifting actuator 62 to increase or decrease the tension in the lifting cable 63. As tension is increased, the lifting cable 63 lifts the platform member 11 from the ground in a curvilinear arc towards the RV entrance, as shown in FIG. 3. As tension is decreased, the lifting cable 63 lowers the platform member 11 from the RV entrance to the ground.

Upon lowering and securing the individual elements, the lift system may be operated solely by the occupant of a wheelchair. For transportation to the inside of the RV 80, the occupant operates the wheelchair onto the upper surface of the platform member 11. The occupant next engages the support stop element 16. The occupant next raises the lift via a switch 75. The occupant may then enter the RV by operating the wheelchair across the platform ramp and into the RV 80. Conversely, transportation out of the RV 80 requires similar operation.

Advantages of the Invention

The lift system of embodiments of the invention may be easily installed on vehicles without significant modification to the vehicle or vehicle frame. Moreover, the lift system does not interfere with factory installed RV steps, and can be used while the steps are fully deployed. The lift system also functions on an RV's existent 12 volt power supply.

Lift systems of embodiments of the invention do not depend solely on the structural strength or suspension of a vehicle during lifting. After deployment, lifting point load forces are supported by the ground and the elements of the lift system (as opposed to the vehicle frame). Embodiments of the invention may handle 500 lb loads (although embodiments of the invention can be made to handle more) without significant modification to a vehicle frame. The result of such a design reduces stress or strain on the structure of the vehicle.

Alternatives

Other embodiments are contemplated by embodiments of the invention. For example, the platform lifting member arrangement and ground frame lifting arrangement may employ a different type of lifting activation, such as: hydraulic lifts; pneumatic lifts; or other mechanically operated lifts capable of performing equivalent functions. Such lift systems may use one or more combinations of pulleys, or may use an equivalent mechanical structure.

For example, in an alternate embodiment of the invention, a self-supporting platform style lift system 110 comprises: a platform member 111; a ground frame 121*a*, 121*b*; a lifting frame 130; a platform support frame system 141, 143; a rotating frame 150; and a ground frame lifting arrangement 171-174 as described as in the preferred embodiment. The self-supporting style lift system 110 also comprises a platform lifting member arrangement 161-163 which differs from that of the preferred embodiment, as illustrated in FIGS. 10-13. Specifically, the platform lifting member arrangement 161-163 of the alternate embodiment allows the platform member 111 to be raised or lowered between the ground and the entrance 182 of the RV 180 without the use of the pulleys or lifting cable (as described in the preferred embodiment in elements 63-64). The platform lifting member arrangement 161-163 of the alternate embodiment uses a lifting motor 161 driving a lifting actuator 162. The lifting motor 161 and lifting actuation are rotatable fasted to the rotating frame 150. A lifting cable 163 extends from the lifting actuator 162 to a coupling bracket 164 The coupling bracket 164 is directly connected to the lifting frame 130 (as opposed to the pulley and cable system as described in the preferred embodiment). As shown in FIGS. 10-13, the lifting motor 161 and lifting actuator 162 are capable of axial rotation about the rotating frame 150 during raising and lowering of the platform member 111. Activation of the lifting motor 161 causes the lifting actuator 162 to exert a force on the lifting cable 164, coupling bracket 164, and lifting frame 130, which in turn the allows the platform member 111 to be raised or lowered between the ground and the entrance 182 of the RV 180.

The frame, lifting frame, and platform support frame, may also encompass alternate configurations. For example, such surfaces have been described in detail as pairs of elongate extending members. However, such structures may also be comprised of a single solid structure, with equivalent mechanical structure.

The number and placement of switches may vary between embodiments of the invention. For example, a switch may be added to any of the surfaces of the platform member, ground frame, lifting frame, and platform support frame.

Differing combinations and permutations of the embodiments set forth are contemplated by the current invention. Additionally, all functional equivalents of materials used and means of attachment of elements are contemplated by the current invention. Therefore, the spirit and scope of the appended claims should not be limited to the descriptions of the preferred versions and alternate embodiments set forth herein.

Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

What is claimed is:

1. A self-supporting platform style lift system to assist in ingress and egress from a vehicle comprising:
   a. a platform member forming a resting surface, having a front end and a back end;
   b. a rotating frame mounted to a vehicle frame wherein said rotating frame is capable of axial rotation at one end of said rotating frame in relation to said vehicle frame;

c. a ground frame comprising at least one individual support member, wherein said at least one individual support member extends perpendicular from said rotating frame;
d. a lifting frame rotatably fastened at one end of said lifting frame to said rotating frame, and rotatably fastened at another end of said lifting frame to said back end of said platform member;
e. a platform support frame system comprising a lower support member and a pivot member, wherein said lower support member is rotatably fastened at one end of said lower support member to said lifting frame, and rotatably fastened at another end of said lower support member to said pivot member, and wherein said pivot member is rotatably fastened at one end of said pivot member to said lower support member, and wherein said pivot member is rotatably fastened at another end of said lower support member to said back end of said platform member;
f. a ground frame lifting arrangement, wherein activation of said ground frame lifting arrangement allows for axial rotation of said rotating frame with respect to said vehicle frame; and
g. a platform member lifting arrangement, wherein activation of said platform member lifting arrangement causes said lifting frame to axially rotate in relation to said ground frame, thereby causing said platform support frame system and said platform member to axially rotate in relation to said vehicle.

2. The self-supporting platform style lift system of claim 1, wherein said platform member is substantially planar, and constructed of a resilient material.

3. The self-supporting platform style lift system of claim 2, wherein said platform member has a platform frame, providing structural support for the platform member.

4. The self-supporting platform style lift system of claim 1, wherein said platform member further comprises a support stop element, rotatably fastened to the front end of said platform member.

5. The self-supporting platform style lift system of claim 4, wherein said support stop element is comprised of a rear stop surface and a front stop surface, wherein said rear stop surface and said front stop surface meet near the center of said support stop surface, forming a dihedral angle.

6. The self-supporting platform style lift system of claim 1, wherein said rotating frame is a resilient longitudinally extending support frame.

7. The self-supporting platform style lift system of claim 6, wherein said rotating frame is a resilient longitudinally extending support frame comprised of a pair of beam support members extending across said rotating frame.

8. The self-supporting platform style lift system of claim 1, wherein said ground frame is constructed of a pair of longitudinally extending support beams constructed of resilient material.

9. The self-supporting platform style lift system of claim 8, wherein said pair of longitudinally extending support beams are spaced a distance apart approximately the width of said platform member.

10. The self-supporting platform style lift system of claim 1, wherein said lifting frame comprises a pair of lifting frame support members, wherein each of said lifting frame support members is capable of axial rotation about a lift pivot.

11. The self-supporting platform style lift system of claim 10, wherein said pair of lifting frame support members rotates axially upward about said lift pivot, applying an upward moment force on said platform member during lifting of said platform member.

12. The self-supporting platform style lift system of claim 10, wherein said pair of lifting frame support members rotates axially downward about said lift pivot, allowing said platform member to descend during deployment of said platform member.

13. The self-supporting platform style lift system of claim 1, wherein said lower support member is a substantially planar, rigid, support body, which rotatably fastens to a side surface of said platform member.

14. The self-supporting platform style lift system of claim 1, wherein said pivot member comprises a pair of longitudinally extending beams rotatably fastened to said platform member at one end of said pair of longitudinally extending beams, and wherein said pair of longitudinally extending beams rotatably fastens to a lift pivot at another end of said pair of longitudinally extending beams.

15. The self-supporting platform style lift system of claim 1, wherein said ground frame lifting arrangement comprises a deployment motor fixedly attached to said rotating frame, a deployment actuator fixedly attached to said rotating frame and driven by said deployment motor, a deployment pulley fixedly attached to said rotating frame, and a deployment cable extending from said deployment actuator over said deployment pulley, and fixedly attached to said vehicle frame.

16. The self-supporting platform style lift system of claim 15, wherein at least one electrical switch allows an operator to activate said ground frame lifting arrangement.

17. The self-supporting platform style lift system of claim 1, wherein said platform member lifting arrangement comprises a lifting motor fixedly attached to said rotating frame, a lifting actuator fixedly attached to said rotating frame and driven by said lifting motor, an at least one lifting pulley located on the upper surface of said at least one individual support member, an at least one rotating frame pulley located on said rotating frame, and a lifting cable extending from said lifting actuator over said at least one rotating frame pulley, into said at least one individual support member, over said at least one lifting pulley, underneath said lifting frame, and attached to said platform member.

18. The self-supporting platform style lift system of claim 17, wherein at least one electrical switch allows an operator to activate said platform member lifting arrangement.

19. The self-supporting platform style lift system of claim 1, wherein said platform member lifting arrangement comprises a lifting motor fixedly attached to said rotating frame, a lifting actuator fixedly attached to said rotating frame and driven by said lifting motor, and wherein said lifting actuator is attached to said lifting frame.

20. A self-supporting platform style lift system to assist in ingress and egress from a vehicle comprising:
a. a platform member forming a resting surface, having a front end and a back end;
b. a rotating frame mounted to a vehicle frame wherein said rotating frame is capable of axial rotation at one end of said rotating frame in relation to said vehicle frame;
c. a ground frame comprising a pair of individual support beams, wherein each of said individual support beams extend perpendicular from said rotating frame, and wherein each of said individual support beams are spaced a distance apart approximately the width of said platform member;

d. a lifting frame rotatably fastened at one end of said lifting frame to said rotating frame, and rotatably fastened at another end of said lifting frame to said back end of said platform member;

e. a platform support frame system comprising a lower support member and a pivot member, wherein said lower support member is rotatably fastened at one end of said lower support member to said lifting frame, and rotatably fastened at another end of said lower support member to said pivot member, and wherein said pivot member is rotatably fastened at one end of said pivot member to said lower support member, and wherein said pivot member is rotatably fastened at another end of said lower support member to said back end of said platform member;

f. a ground frame lifting arrangement, wherein activation of said ground frame lifting arrangement allows for axial rotation of said rotating frame with respect to said vehicle frame;

g. a platform member lifting arrangement, wherein activation of said platform member lifting arrangement causes said lifting frame to axially rotate in relation to said ground frame, thereby causing said platform support frame system and said platform member to axially rotate in relation to said vehicle; and h. wherein said self-supporting lift system is movable between a transport position to a lifting position, wherein in said transport position, the rotating frame is raised such that it is substantially parallel with said vehicle frame, said platform member, said ground frame, said lifting frame, and said platform support frame system are raised such that they are substantially parallel with the side surface of said vehicle, and perpendicular with the ground, and wherein in said lifting position position, said rotating frame is axially rotated away from said vehicle frame towards the ground, and said ground frame makes contact with the ground, allowing said lifting frame, and said platform support frame system to raise and lower said platform member upon activation of said platform member lifting arrangement.

21. A self-supporting platform style lift system to assist in ingress and egress from a vehicle comprising:

a. a platform member forming a resting surface, having a front end and a back end;

b. a rotating frame mounted to a vehicle frame wherein said rotating frame is capable of axial rotation at one end of said rotating frame in relation to said vehicle frame;

c. a ground frame comprising a pair of individual support beams, wherein each of said individual support beams extend perpendicular from said rotating frame, and wherein each of said individual support beams are spaced a distance apart approximately the width of said platform member;

d. a lifting frame rotatably fastened at one end of said lifting frame to said rotating frame, and rotatably fastened at another end of said lifting frame to said back end of said platform member;

e. a platform support frame system comprising a lower support member and a pivot member, wherein said lower support member is rotatably fastened at one end of said lower support member to said lifting frame, and rotatably fastened at another end of said lower support member to said pivot member, and wherein said pivot member is rotatably fastened at one end of said pivot member to said lower support member, and wherein said pivot member is rotatably fastened at another end of said lower support member to said back end of said platform member;

f. a ground frame lifting arrangement, wherein activation of said ground frame lifting arrangement allows for axial rotation of said rotating frame with respect to said vehicle frame, and wherein said ground frame lifting arrangement comprises a deployment motor fixedly attached to said rotating frame, a deployment actuator fixedly attached to said rotating frame and driven by said deployment motor, a deployment pulley fixedly attached to said rotating frame, and a deployment cable extending from said deployment actuator over said deployment pulley, and fixedly attached to said vehicle frame; and g. a platform member lifting arrangement, wherein activation of said platform member lifting arrangement causes said lifting frame to axially rotate in relation to said ground frame, thereby causing said platform support frame system and said platform member to axially rotate in relation to said vehicle, and wherein said platform member lifting arrangement comprises a lifting motor fixedly attached to said rotating frame, a lifting actuator fixedly attached to said rotating frame and driven by said lifting motor, and wherein said lifting actuator is attached to said lifting frame.

* * * * *